Figure 1:
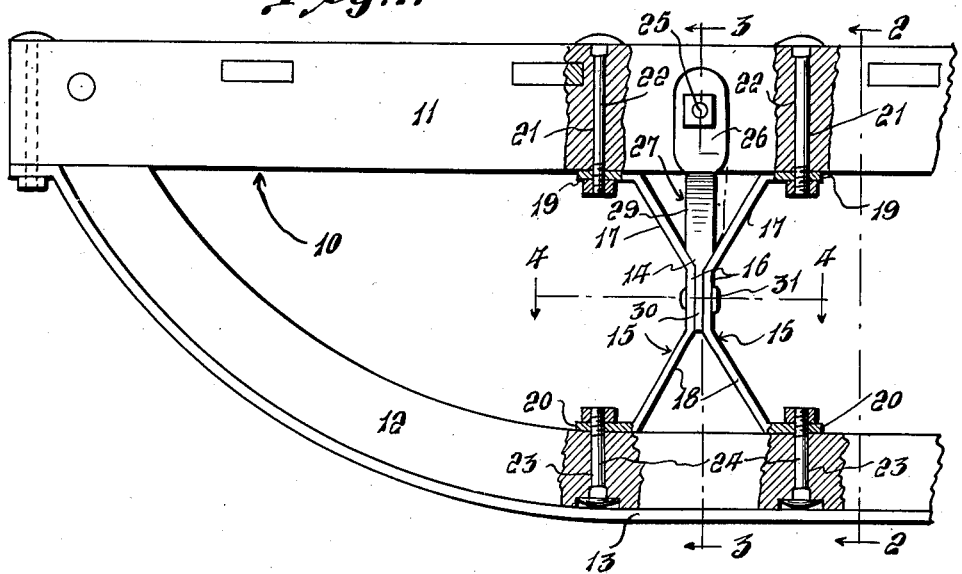

May 9, 1939.  O. B. McNEES  2,157,962

SLED KNEE

Filed Dec. 23, 1937

Inventor
O. B. McNees
By L. F. Rudolph
Attorney

Patented May 9, 1939

2,157,962

UNITED STATES PATENT OFFICE 2,157,962

SLED KNEE

Ora B. McNees, Robinson, Ky.

Application December 23, 1937, Serial No. 181,442

1 Claim. (Cl. 280—27)

This invention relates to an improved sled knee adapted to be bolted to the sled top bar and rail.

An important object of this invention is to provide a sled knee that can be readily applied or removed and which will form a rigid connection between the top bar and runner rail.

Another object of this invention is to provide a supplementary brace forming a part of the sled knee and adapted to prevent lateral sway of the sled.

A particular advantage of this device resides in the fact that conventional type farm sleds may be home made with the use of the sled knee comprising this invention which is bolted to the sled.

Figure 2:
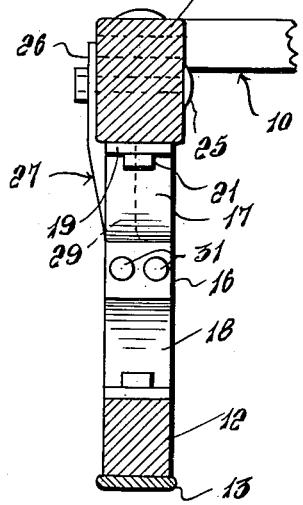
Figure 3:
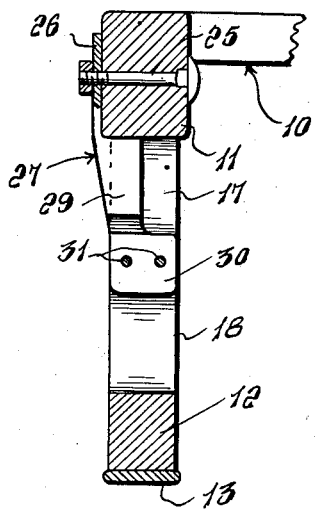
Figure 4:
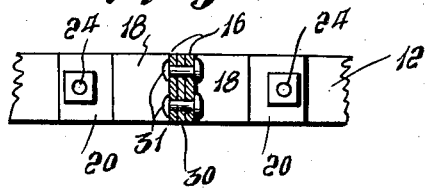

Other objects and advantages of the invention will hereafter become more fully apparent from the following specification of which the drawing forms a part, and wherein:

Figure 1 is a fragmentary side elevational view partially in section showing the device in position on a sled, Figure 2 is a vertical sectional view on the line 2—2 of Figure 1, Figure 3 is a vertical sectional view on the line 3—3 of Figure 1, and Figure 4 is a cross sectional view on the line 4—4 of Figure 1.

Referring more particularly to the drawing wherein like reference characters designate like or corresponding parts throughout the different views, 10 designates a portion of a sled including the conventional horizontally disposed top bar 11, the runner rail 12, and the runner 13 shown for the purpose of illustrating the invention.

The sled knee 14 includes the corresponding members 15 having the intermediate portions 16 disposed substantially parallel to each other, and the angular portions 17 and 18 extending outwardly therefrom at oblique angles. The terminals 19 and 20 of the portions 17 and 18 respectively are bent outwardly to engage against the underside of bar 11 and the top of rail 12 respectively.

Bar 11 and terminals 19 are provided with the alined openings 21 through which extend fastenings 22 to secure terminals 19 to top bar 11. Rail 12 and terminals 20 are likewise provided with alined openings 23 through which extend the fastenings 24, which are countersunk in rail 12 to secure terminals 20 to the rail.

Secured to the outerside of bar 11 between terminals 19 by means of fastening 25 is the enlarged head 26 of the brace 27. Brace 27 extends downwardly to form portion 29 which is narrow but thicker than head 26 and which is disposed between members 17. The upper end of portion 29 abuts against the underside of the bar 11 and the lower end is tapered to fit between the adjacent portions of members 17. Portion 29 terminates in the portion 30 which is substantially the same size as portions 16 and which is disposed between said portions.

Rivets 31 which extend through portions 16 and 30 to secure them together, complete the assembly of the sled knee 14 including the corresponding members 15 and the brace 27.

It will be obvious, that the sled knee 14 may readily be applied or removed, as heretofore described, and being formed preferably of steel will provide a strong rigid support. The brace 27, which is rigidly secured to top bar 11 and members 15 will prevent lateral sway of sled 10 which might tend to bend members 15.

Various modifications and changes in the device as illustrated and described, may obviously be made without departing from the spirit and scope of the invention as hereinafter defined by the claim.

I claim as my invention:

A sled knee comprising a pair of corresponding braces having their intermediate portions disposed at right angles to their ends and provided with oblique portions connecting the middle and ends of each member, an end of each of said braces being secured to a runner rail and to a top rail, a brace having an enlarged end adapted to be secured to the outer side of the top rail between two of said ends, an intermediate portion thickened at right angles to the plane of said enlarged end to provide a shoulder to engage the underside of said top rail, said intermediate portion terminating in a lower flattened end, disposed at right angles to the end and shaped and disposed to fit between the middles of said first mentioned braces, fastenings connecting said last mentioned end and middles.

ORA B. McNEES.